United States Patent [19]
Hurley

[11] 3,809,973
[45] May 7, 1974

[54] MULTILAYER CERAMIC CAPACITOR AND METHOD OF TERMINATING
[75] Inventor: Thomas P. Hurley, Pownal, Vt.
[73] Assignee: Sprague Electric Company, North Adams, Mass.
[22] Filed: July 6, 1973
[21] Appl. No.: 377,007

[52] U.S. Cl................. 317/258, 29/25.42, 317/261
[51] Int. Cl............................................. H01g 1/14
[58] Field of Search ......... 317/258; 1/261; 29/25.42

[56] References Cited
UNITED STATES PATENTS
2,899,345  8/1959  Oshry.................................. 317/258
3,648,132  3/1972  Rayburn ............................ 317/261

Primary Examiner—E. A. Goldberg
Attorney, Agent, or Firm—Arthur G. Connolly

[57] ABSTRACT

In a multilayer ceramic capacitor having base metal electrodes, a thin film of gold covers the electrode edges that are flush with the ceramic body faces. The capacitor terminals consist in silver coverings that are bonded to each of these faces and the gilded electrode edges. A method of immersion plating is employed to accomplish a selective deposition of gold on only the electrode edges.

3 Claims, 1 Drawing Figure

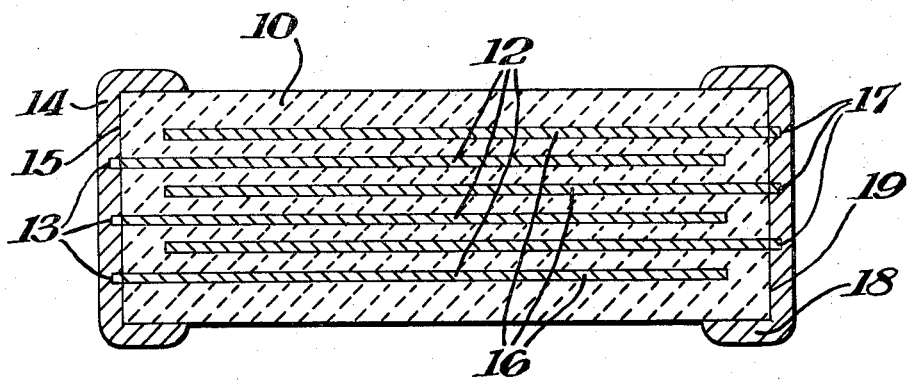

MULTILAYER CERAMIC CAPACITOR AND METHOD OF TERMINATING

BACKGROUND OF THE INVENTION

This invention relates to multilayer ceramic capacitors and more particularly to multilayer capacitors having electrodes of a base metal.

A large portion of the multilayer ceramic capacitors made today employ electrodes comprised of a noble metal such as platinum or palladium that will not oxidize or react with the ceramic material at the high temperatures used in firing. Toward the substitution of much less expensive base metals for such noble metal electrodes, much effort has been made in the art of formulating and processing ceramic materials that are compatible with base metal electrodes. Such a system is disclosed in our copending application Ser. No. 130,692 by Eror, et al., filed on 4-2-71.

Another known formulation comprises barium titanate together with a substantial quantity of manganous oxide fired in hydrogen. Another formulation comprises barium titanate, manganous oxide and magnesium oxide. Yet another comprises barium titanate, manganous oxide, ferric oxide, and ceric oxide.

Such systems all require a firing in a reducing or inert atmosphere. These firing conditions mitigate against oxidation and probable dissolution of the base metal electrode into the ceramic body and result in a continuous metal layer. However, oxygen vacancies normally exist in a ceramic having been fired in a reducing atmosphere resulting in the formation of $Ti^{3+}$ ions. As a consequence the electrical conductivity is high and thus the RC product of the resulting capacitor is low.

It is known that a post air firing, at temperatures lower than the earlier firing temperatures, is one effective means for eliminating the oxygen vacancies and for making a capacitor having a high RC product. Such a post air firing, however, oxidizes the exposed base metal electrode edges, making effective termination difficult because of the poor conductivity of the oxide coating.

It is therefore an object of this invention to provide a multilayer ceramic capacitor having base metal electrodes with reliable and low resistance connections between the capacitor terminals and the electrodes.

It is a further object of this invention to provide a multilayer ceramic capacitor with base metal electrodes, having a high RC product.

It is a further object of this invention to provide a base metal electrode capacitor having low cost.

SUMMARY OF THE INVENTION

In a multilayer ceramic capacitor having base metal electrodes, a thin film of gold covers the electrode edges that are flush with faces of the ceramic body. The capacitor terminals consist in conductive coatings being bonded to each of said faces and in contact with the thin gold film. A method for making this capacitor comprises depositing a thin film of gold on the electrode edges, applying a conductive paste over said faces, and post firing the body in an air atmosphere. The gold film prevents oxidation of the base metal electrodes at post-air firing and provides a low impedance connection between electrodes and terminals. The post-air firing cures the conductive covering and also results in a capacitor having a high RC product. The preferred method of depositing the gold film is by immersion plating, selectively plating the electrode edges only, requiring no masking, and using a very small quantity of gold.

BRIEF DESCRIPTION OF THE DRAWING

The FIGURE shows a cross sectional view of a multilayer ceramic capacitor representing the preferred embodiment of this invention.

DESCRIPTION OF THE PREFERRED EMBODIMENT

In the FIGURE is shown a first preferred embodiment of this invention. This multilayer ceramic capacitor has a ceramic body 10 and interleaved therein is a plurality of electrode layers 12 and 16. Adjacent layers are separated by a thin region of the ceramic material of the body 10. Alternate electrode layers 12 have edges that extend to one face 15 of the body 10 and alternate layers 16 extend to another and opposite face 19 of the body 10. Films of gold 13 and 17 are deposited on the edges of the electrode layers 12 and 16, respectively. A first conductive coating 14 covers the left face (as shown in the FIGURE) of the body 10 and a second conductive coating covers the right face of the body 10 and these first and second coatings make intimate electrical contact with the gold films 13 and 17, respectively. The two conductive coatings serve as the terminals of the capacitor. The drawing of the FIGURE is not to scale, and more particularly the thickness of the electrodes and the gold films are exaggerated to more clearly show the construction.

In a preferred method for making a multilayer ceramic capacitor of this invention, a capacitor body with nickel electrodes is formed as described in the aforementioned copending application Ser. No. 130,692; namely employing a barium titanate formulation of 89 percent $BaTiO_3$, 10 percent $CaZrO_3$, and less than 1 percent of other elements, and adding 2.18 percent BaO; and applying successive layers of the ceramic formulation and a paste containing nickel particles by screening. The resulting multilayer ceramic part is then cut or diced to form individual bodies each body being such as that depicted in the FIGURE and described as body 10 with electrodes 12 and 16.

In a subsequent step, the two body faces 15 and 19 are abraded to eliminate any smeared particles of the ceramic from the exposed nickel edges that have resulted from the cutting or dicing operation. The bodies are then fired at 1,350°C in an atmosphere of CO and $CO_2$ giving a partial oxygen pressure of $3 \times 10^{-8}$ atmospheres.

The exposed nickel electrode edges are then immersion plated with a thin film of gold. More precisely, the body is immersed in a proprietary commercial immersion gold solution such as (1) Atomex made by Engelhard Industries, Electro Metallic's Div. of Englehard Minerals and Chemicals Corp., Newark, N.J.; (2) Sel-Rex Immersion Gold I made by Sel-Rex Co., Div. of OxyMetal Finishing Corp., Nutley, N.J.; or (3) Oromerse made by Technic, Inc., Providence, R.I. The body is immersed for 20 minutes at approximately 65° C. Agitation of the solution is preferred but not essential. After removal from the gold solution the body is washed in tap water to remove adhering gold solution, and is dried either at room temperature or at 50°–100° C if greater drying speed is desired.

Next, a silver paste comprising particles of silver and powdered glass frit in an organic resin binder and a solvent is applied to the two faces. Such coatings may alternatively be applied by for example momentarily dipping the two opposite body ends, including the two faces 15 and 19, into the liquid silver paste. It is often desirable that the silver coating extend beyond faces 15 and 19 to a portion of the adjacent sides. A suitable paste is conductive silver paste number 8543 made by E.I.DuPont Co. of Wilmington, Del.

The body is subsequently post fired in an air atmosphere for about 20 minutes wherein the part is raised in temperature from room ambient to 800° C in 5 minutes, remaining at this temperature for 10 minutes, and cooling to room ambient in about 5 minutes. This post firing cures the silver coatings. It also has the effect of greatly increasing the elevated temperature insulation resistance of the capacitor as shown in Table I. The gold film prevents oxidation of the nickel edges and provides a highly conductive interface with the silver and the nickel.

Table I

| | cap | RxC at 125°C |
|---|---|---|
| without post-air firing | 1.10 mfd | 5.5 ohm-farads |
| post-air fired at 800°C | 1.05 mfd | 1900 ohm-farads |

Experience has shown that when, without the gold film, a silver paste coating is applied and fired in an air atmosphere, no connection of the overlying silver conductive coating to internal electrodes is obtained as evidenced by finding essentially zero capacitance due to oxides of nickel having formed at the interface between the nickel and the silver.

It is expected that other noble metals than gold, such as the platinum group, will be suitable for use as the protective conducting films 13 and 17.

In the preferred embodiment of this invention a film of gold having a thickness on the order of 0.1 microns covers the nickel electrode edges. Thus the amount of gold used is very small and its contribution to the cost of the capacitor is also very small. Other methods of applying the gold than immersion plating may be employed such as by conventional electroless plating or by sputtering. These other methods may be used to cover the ends of the capacitor body but are generally not capable of the highly selective deposition of gold on the nickel electrode edges. On the other hand, the preferred immersion plating provides a highly accurate deposition of gold thickness since the thickness is a natural function of the composition of the plating solution and the temperature. Thus the minute quantities of gold required, the simplicity of the method, and the consequent low cost associated with immersion plating have led to its selection as the preferred method.

Immersion plating is distinguished from other plating means in that the gold, in this case, replaces metal at the surface of the metal object being plated. Noble metals other than pure gold may be used in immersion plating. In making a multilayer capacitor of this invention other protective noble metals such as palladium, platinum, silver, or alloys of said metals with gold are expected to be appropriate.

Any base metals or alloys thereof may be used for the electrodes if they do not react with the ceramic composition and do not melt below the firing temperatures. Nickel, cobalt, iron, and alloys thereof are especially suitable. Ceramic compositions such as those mentioned having the aforementioned compatability with the particular base metal electrodes chosen will also be suitable.

What is claimed is:

1. A multilayer ceramic capacitor comprising:
   a. a ceramic body;
   b. a plurality of electrode layers, said electrode layers consisting of a base metal or an alloy of base metals; the edges of alternate said layers extending to one face of said body and edges of the other said layers extending to another face of said body; and
   c. a film of gold being deposited on said electrode edges;
   d. a first and second conductive coating being bonded to said one and said another face, respectively, each said coating making intimate electrical contact with said gold electrode edges, said first and second coatings serving as the two terminals of said capacitor.

2. A method for making a multilayer ceramic capacitor comprising:
   a. firing in a reducing atmosphere a ceramic body having base metal electrodes embedded therein thereby curing and sintering said ceramic body and said electrodes, respectively;
   b. depositing a film of gold on said exposed electrode edges;
   c. applying a conductive paste to each face of said body having exposed electrode edges; and
   d. firing said body in an air atmosphere such that said coatings are cured and each forms a terminal of said capacitor.

3. The method of claim 2 wherein said depositing is accomplished by gold immersion plating.

* * * * *

UNITED STATES PATENT OFFICE
CERTIFICATE OF CORRECTION

Patent No. 3,809,973          Dated May 7, 1974

Inventor(s) Thomas P. Hurley

It is certified that error appears in the above-identified patent and that said Letters Patent are hereby corrected as shown below:

Col. 2, lines 46 thru 52 the order of the two sentences should be reversed to read:

"The bodies are then fired at $1350^\circ C$ in an atmosphere of CO and $CO_2$ giving a partial oxygen pressure of $3\times10^{-8}$ atmospheres. In a subsequent step, the two body faces 15 and 19 are abraded to eliminate any smeared particles of the ceramic from the exposed nickel edges that have resulted from the cutting or dicing operation."

Claim 2, line 7, (Col. 4, line 43) "said" should be -- the --

Claim 2, line 7, (Col. 4, line 43) delete "electrode"

Claim 2, line 8, (Col. 4, line 44) after "edges" insert -- of said electrodes --

Claim 2, line 9, (Col. 4, line 45) after "paste" insert -- coating --

Claim 2, line 10, (Col. 4, line 46) after "having" insert -- said --

Signed and sealed this 10th day of September 1974.

(SEAL)
Attest:

McCOY M. GIBSON, JR.          C. MARSHALL DANN
Attesting Officer          Commissioner of Patents